Patented Oct. 15, 1940

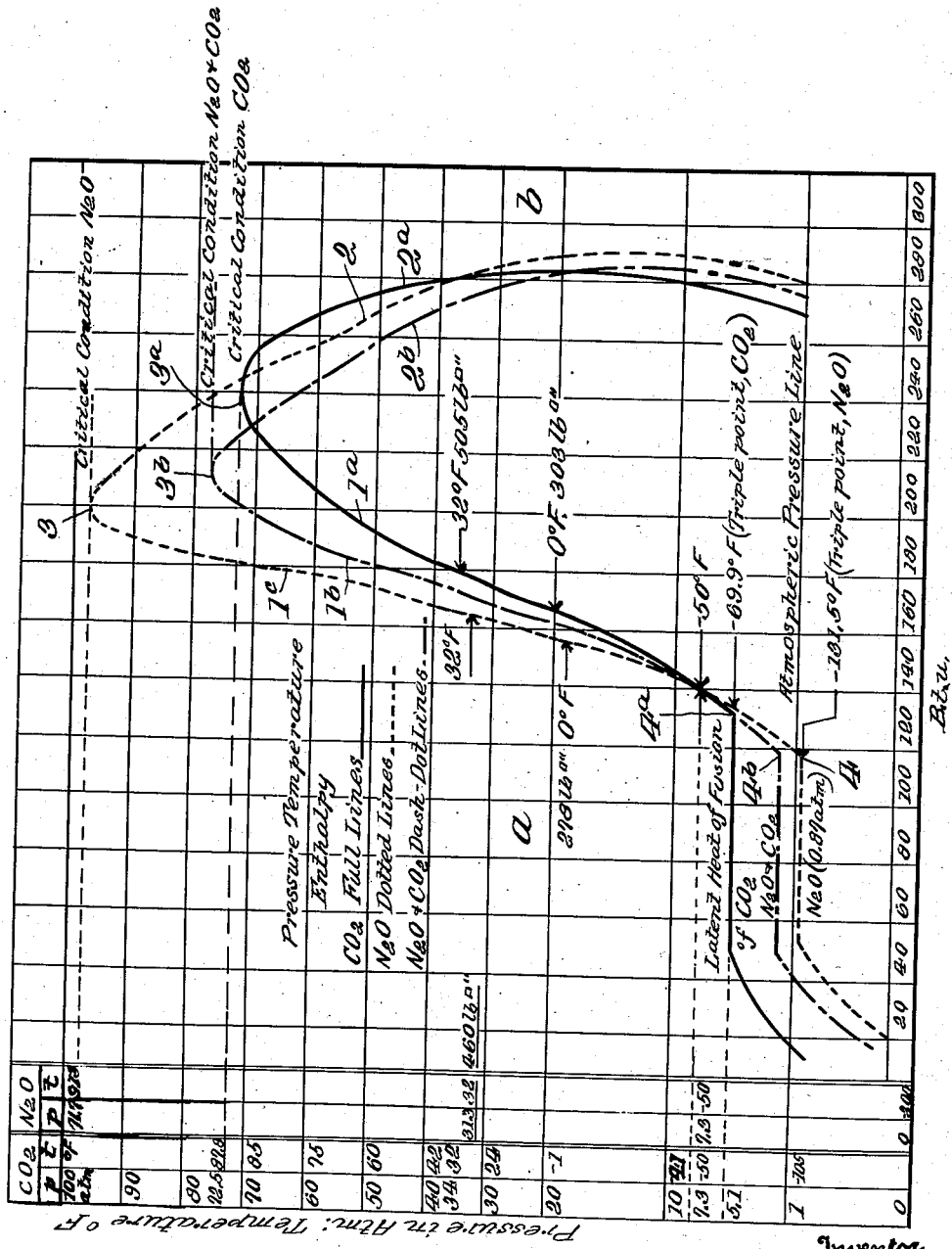

2,217,678

UNITED STATES PATENT OFFICE 2,217,678

SOLIDIFICATION OF GASES

Justus C. Goosmann, Chicago, Ill., assignor to The S. S. White Dental Manufacturing Company, a corporation of Pennsylvania Application September 24, 1937, Serial No. 165,459

7 Claims. (Cl. 252—1)

This invention relates to the solidification of a nitrous oxide ($N_2O$) product and its fixation in a stable solid form.

Nitrous oxide is either a liquid or a gas at normal barometric pressures, depending upon its temperature, as its triple point is below atmospheric pressure. Hence, it is transported in steel cylinders, as a liquefied gas.

Tests have demonstrated that a mixture of nitrous oxide with an inert gas, preferably carbon dioxide, comprises many possibilities which are successfully attained when this mixture is employed for diverse purposes and when it is applied and made useful by means of mechanical devices, apparatus and equipment appropriately selected for numerous specific needs. When nitrous oxide so modified is solidified, it becomes stable in that combination. It has also been found that other desirable changes are attained in the character of nitrous oxide by the admixture with a gas such as carbon dioxide which is non-combustible and does not support combustion.

The substance employed in admixture with the nitrous oxide should be selected from the materials possessing properties similar to those of nitrous oxide. It is normally preferred to employ carbon dioxide for this purpose because of the similarity of its physical properties with those of nitrous oxide. The molecular weights of the two gases are substantially identical; the vapors have nearly equal rates of diffusion; the enthalpy units are almost the same throughout the process of liquefaction and evaporation; they may be crystallized and have apparently the same electronic relations in the molecule so that they provide similar crystalline structures and have similar magnetic properties; and when employed as a circulable refrigerating agent, the mixture may be considered as a one-component fluid because of the similarity of the vapor pressures of the constituents.

It is well known today that substances will change their physical form when subjected to corresponding changes in pressure, temperature and volume; provided that decomposition, rearrangement, or other chemical change does not intervene. This applies fundamentally to all gases. However, each gas has its own physical characteristics correlating pressure, temperature and volume at which such changes in its respective physical form, or in its state, takes place. Carbon dioxide is one of the gases which is quite easily induced to change its form or state from a gas to liquid and again to a solid.

Nitrous oxide has properties similar to those of carbon dioxide in pressure, temperature and volume. It liquefies under conditions which closely correspond with those of carbon dioxide. Its critical condition of liquefaction is somewhat higher in temperature than that of carbon dioxide without, however, any great difference in pressure. In has border lines for the liquid and the saturated vapor conditions which almost merge with those for carbon dioxide. The latent heat of its liquid, or its liquid enthalpy, while it passes from a liquid into vapor within the field bounded by its liquid and saturated vapor border lines, is likewise not far different from the enthalpy of liquid carbon dioxide. To point out additional similarities between nitrous oxide and carbon dioxide, attention is directed to the fact that at temperatures near or below minus 50° F. the evaporating pressures of both liquid substances are very nearly alike, even though the heat content of liquid nitrous oxide is somewhat better than that of carbon dioxide.

A differentiation between the two substances in pressure and temperature occurs at the change in state from liquid to solid at their respective triple points. Carbon dioxide solidifies while it is still well up in the pressure scale (at 75 lb. absolute with a temperature of very close to minus 70° F.) while nitrous oxide dips below the atmospheric pressure line (14.7 lb.) to 12.75 lb. absolute with a required temperature for solidification of about minus 131.5° F. This characteristic difference between the two gases explains the fact that carbon dioxide cannot exist in its liquid form at atmospheric pressure while nitrous oxide remains a liquid at ordinary barometric pressure until completely evaporated. Thus, if nitrous oxide has been solidified at say 12 lbs. absolute, and is restored to atmospheric pressure, it liquefies and then evaporates as a liquid, whereas carbon dioxide under like conditions will remain solid and sublime directly into the gaseous state.

A primary object of this invention is to prepare a nitrous oxide product having a triple point above the atmospheric pressure line, with a corresponding increase in temperature, so that the solidified mass remains stable as a solid under atmospheric pressure, and is subject only to sublimation similar to solid carbon dioxide.

A further object is preparation of such a product by the addition of an inert and non-combustible gas whereby the tendency of nitrous oxide to support combustion is reduced.

A most important object of this invention is the preparation of a new refrigerant which may be easily shipped and handled and employed in a standard refrigerating cycle to produce a low temperature refrigeration as low in the temperature scale as approximately minus 100° F. This new refrigerant has the additional advantages of an increased critical temperature of liquefaction above that of carbon dioxide and thermal efficiencies for refrigerating work greater than those of carbon dioxide.

A further object is the provision of a solid product which sublimes at the atmospheric pressure while absorbing heat from a surrounding medium and which is capable of thus producing a cooling to a lower temperature than can be produced by solidified carbon dioxide.

This invention comprises additional objects, as will be set out in the following specification, illustrated by means of superimposed diagrams, and pointed out in the appended claims.

The drawing comprises diagrams of the Mollier type in which the characteristics of several gaseous bodies including nitrous oxide and carbon dioxide are shown in superimposed relationship. A typical modified medium is also illustrated in this diagram, conventionally shown in appropriate position within the border lines of the two component substances. A perusal of the superimposed diagrams permits a study of the relative properties of nitrous oxide and carbon dioxide while undergoing changes in state from the gaseous to the liquid, and from the liquid to the solid condition.

A diagram of the characteristics of nitrous oxide is shown in dotted lines. Pressure and temperature figures are shown in separate columns to the left, indicating the triple point at 0.87 atm. and a corresponding temperature of minus 131.5° F.

The borders between liquid-solid and gas-liquid for nitrous oxide are indicated in the diagram by the line 1, 2. The liquid field, $a$, is located to the left of the portion 1 of the liquid border line. The superheated zone $b$ is found to the right of the vapor border line 2. The area between lines 1 and 2 represents the latent heat of the medium during liquefaction or the latent heat of evaporation without change in temperature and pressure. The region 3 denotes the dome of the nitrous oxide diagram, above which the medium cannot be liquefied. The point 4 is the triple point of pure nitrous oxide. The latent heat of fusion will be found indicated in B. t. u. at the abscissae of the diagram, where the enthalpy of the medium is also stated, beginning with the arbitrary setting of zero at zero pressure.

The carbon dioxide diagram $1a$, $2a$, $3a$, $4a$, is shown in this figure in solid lines. Temperature and pressure relations are given in the pressure-temperature column at the left. The triple point $4a$ of solidification, which occurs for carbon dioxide at minus 70° F. and a pressure of 75 lb. absolute, is particularly to be noted.

The third diagram $1b$, $2b$, $3b$, $4b$, indicating an admixture of carbon dioxide with nitrous oxide, is also drawn, superimposed in dash-and-dot lines. Pressures and temperatures for this conventionally indicated medium are not stated along the ordinates for obvious reasons since these vary with the percentage of the mixture. The triple point $4b$ of the mixture is above the atmospheric pressure line. The exact location of this triple point depends upon the percentage of mixture of carbon dioxide with the nitrous oxide gas.

This admixture diagram shows that the triple point, which with nitrous oxide occurs ordinarily at −131.5° F. and at 0.87 atmosphere, has been raised from a pressure below that of the atmosphere to one considerably above ordinary barometric, whereby it is now possible to solidify the medium and maintain it as a stable solid. Attention is also directed to the latent heat of fusion.

Other disclosures shown in this drawing, for instance the critical domes of liquefaction 3, $3a$, $3b$, are of equal interest and importance. The liquid border lines, 1, $1a$, $1b$, of the three media converge and merge at or near the triple point of carbon dioxide. At 0° F. the vapor pressures of carbon dioxide and nitrous oxide differ slightly, and the difference increases with higher temperature. It is also of interest to observe that the critical condition of liquefaction for nitrous oxide is 10° higher than that for carbon dioxide, but that the pressures of liquefaction are almost alike in both cases. The enthalpies for refrigeration are similar in either case. It is, however, better in the case of nitrous oxide, and also of the mixture, at and below 0° F., than that of carbon dioxide.

Critical conditions of liquefaction at the dome of the diagram and solidification at the triple point have been particularly emphasized, especially in the region of solidification where the pressure and temperature scale has been increased in order that the triple point lines may appear distinctly.

It has been found that the percentage of admixture of the two gases may be varied at will to suit and satisfy specific conditions. For instance, the inventor has established the fact that a small percentage of carbon dioxide (approximately 10% by weight in the mixture) is sufficient to raise the triple point above that of the atmosphere, making it possible in this way to solidify same and maintain it in its solid state subject only to slow sublimation. With the various industrial requirements, the percentage of carbon dioxide in the admixture may be increased above this minimum to suit specific purposes. It has been found necessary for normal employment to have the percentage of carbon dioxide in the binary mixture at least 7% in order to obtain the solidification effects in the mixture; while the maximum percentage to be employed may be more arbitrarily set; thus the percentage when employed in an anaesthetic mixture will not normally exceed 15%, for a gas employed for fluffing ice cream or like substances, the percentage may run as high as 50%, though from 20% to 25% is normally preferred; in the production of freezing mixtures for refrigerators, the percentage of carbon dioxide is normally below 50% and usually below 25%, dependent upon the conditions of operation so that the formation of solid matter may not occur at expansion points in the cycle of refrigeration and so that a desired low temperature may be obtained in the evaporation of sublimation of the mixture: when employed for cooling by sublimation of the solidified mass at atmospheric pressure, the percentage is preferably around 7% to 15%.

When nitrous oxide gas is mixed with a variable percentage of a substantially inert gas such as carbon dioxide, the triple point is raised as stated above the pressure of the atmosphere, and the mixture can then be solidified without difficulty after which it may be stored, and shipped in the solid state. The losses by sublimation from the solid substance are quite similar to those of carbon dioxide. Differential sublimation is small.

The preferred method of preparing a mixture of the two gases in predetermined proportions, is to prepare appropriate volumes of the individual gases and cause one gas to diffuse into the other previous to liquefaction and solidification. This method of diffusion of the two gases has been found accurate, effective and simple. Mixing of the two substances may also be accomplished in their respective liquid or even solid forms, but the resulting diffusion in the latter case will not be as complete nor the resulting mixture as uniform.

The nitrous oxide product, when so prepared by admixture, is solidified at triple point pressures as illustrated in the diagram; it remains stable as a solid and may then be shipped in this state in a similar manner to that in which solidified carbon dioxide is shipped and transported today. The method of solidification may be similar to that for carbon dioxide which has been fully explained by the inventor in his previously granted patents pertaining to the subject of carbon dioxide solidification, with respect to the pressure, temperature and power economy in operation.

The frozen mixture may be shaped and shipped as blocks of desired size and shape, and it can be converted to and handled otherwise as a liquid, if so desired. Thus, the solid may be deposited in a suitable convertor where, upon pressure rise, it will revert into part liquid and part vapor awaiting its use in any of these forms.

The addition of say 10% of carbon dioxide to nitrous oxide, further, appears to have a promoting effect upon the anaesthesia produced in the lower concentrations of nitrous oxide. Nitrous oxide has long been known in the general field of mild anaesthesia for its agreeable effect free from the unpleasant results which attach to many other agents now frequently employed.

The mixture is advantageous for other industrial purposes, such for instance as low temperature mechanical refrigeration, in which case it is charged into the system in its liquid or gaseous form. The low temperature industry is in need of an agent which will produce temperatures much lower than those that can now be obtained. Carbon dioxide has long been looked upon as a desirable low temperature refrigerant, but it solidified at minus 70° in the pipe lines and thereby its low temperature application is limited. Nitrous oxide, on the other hand, has the very low triple point of −131.5° F., but in and by itself it is objectionable for refrigerating purposes because of the fact that it will support a flame or fire when escaped into spaces where a conflagration is in progress.

All of this is modified by the admixture of a measured percentage of carbon dioxide. It provides at the same time the advantage of a higher critical temperature condition for liquefaction with a reduction in its pressure below that of carbon dioxide. It permits evaporating temperatures at or even lower than −100° F. while maintaining satisfactory suction pressures to fill the compressor volume at economical gas density.

The mixture of carbon dioxide and nitrous oxide therefore offers the great advantage in refrigeration; first, of a higher temperature condition for liquefaction; second, the advantage of a much lower temperature of evaporation than offered by carbon dioxide; and third, the fact that solidification is obtained above atmospheric pressure and temperature conditions as shown on the chart, whereby the solidified medium has become stable and can therefore be handled, shipped and used in solid form. When a mixture of nitrous oxide and carbon dioxide of suitable percentage is formed it has been found that its thermal efficiency for refrigerating work is better than that of carbon dioxide alone.

This modified medium in solidified form may also be used for charging cartridges or similar containers wherein it is hermetically sealed awaiting the time of its use for impregnating or increasing the volume and agreeable taste of other substances such as ice cream mix, sweet cream rich in butter fat, mayonnaise, whipped cream and the like. The process of increasing the volume and creaminess of the ice cream, by mechanically beating a definite volume of gaseous medium into it, is well known and is often employed in increasing the volume and fluffiness of liquid ice cream mix while the latter is being solidified by freezing. It is regarded as a necessity for the manufacture of ice cream and similar products to prevent water crystallization and brittleness. Various gaseous substances have been in used in the past. Atmospheric air produces the desired "over-run" of the "mix," but it is never entirely pure nor free from spores and bacteria (except by extremely expensive methods), particularly on the premises of the ordinary ice cream factory. Moreover, it does not add anything to the substance in the way of increasing its palatable characteristic. Carbon dioxide has been tried repeatedly, but it imparts its well known "pungency" to the mix and is therefore not relished by many lovers of ice cream and like delicacies. Nitrous oxide has been employed; but it must be manufactured locally, or shipped with difficulty; and it is observed that it adds even greater sweetness to a substance which is usually oversweet to begin with. A corrective tendency in this respect is therefore more than welcome. A mixture of carbon dioxide and nitrous oxide supplies this remedial correction in excellent manner. It imparts in a measurable way zest, relish and piquancy to an otherwise insipid confection. This modification is entirely controllable.

Aside from this particular application, the admixture of carbon dioxide with nitrous oxide gas has other favorable advantages in its combinations. For instance, it creates a lesser fire hazard and will reduce the support which nitrous oxide renders to combustion, and exert a tendency to diminish the activity of flames and existing conflagrations in an atmosphere of such a mixture. The oxygen content of carbon dioxide cannot ordinarily be separated from its carbon base. Therefore, the presence of carbon dioxide in a nitrous oxide mixture will dilute the available oxygen-bearing gas and thus make it less active and effective in supporting a burning flame or a fire which cannot obtain the necessary oxygen elsewhere. Carbon dioxide in the mixture will retard combustion and eventually subdue it altogether.

It is obvious that the invention is not restricted to the forms set out in detail, but that it may be employed in many ways within the scope of the appended claims.

I now claim and desire to secure by United States Letters Patent the following:

1. A method of preparing a solid product containing nitrous oxide as a major ingredient thereof, and being a solid at atmospheric pressure, which comprises causing predetermined volumes of nitrous oxide and carbon dioxide to diffuse into one another in gaseous form, the proportion of carbon dioxide being at least seven percent of the mixture, thereupon cooling the mixture to produce a solid constituted of the mixture, and shaping said solid into blocks.

2. A solid material comprising a frozen mixture consisting of a major portion of nitrous oxide and a minor portion of carbon dioxide, the proportion of carbon dioxide being sufficient and effective to maintain the triple point of the mixture above atmospheric pressure.

3. An article of manufacture consisting of a solid block of a homogeneous frozen mixture of nitrous oxide with substantially 10 percent of carbon dioxide and characterized in being capable of remaining a solid and subject only to sublimation at atmospheric temperature by having a triple point temperature below 0 degrees F. and a triple point pressure in excess of 14.7 pounds per square inch absolute.

4. An article of manufacture consisting of a solid block of a frozen mixture of nitrous oxide and carbon dioxide, comprising from substantially 7 to 50 percent of carbon dioxide and the remainder substantially being constituted of nitrous oxide, said mixture having a triple point pressure in excess of 14.7 pounds per square inch absolute, and capable of being converted to and remaining in its liquid form by subjecting the same to a pressure above its critical point.

5. A material for producing fluffing or aeration of ice-cream and like substances, consisting of a frozen mixture of nitrous oxide and carbon dioxide, and characterized in being gaseous at the pressures and temperatures employed for the fluffing or aeration of ice-cream, and in having a triple point above atmospheric pressure whereby it can be shipped in unsealed packages as a frozen solid.

6. A material for effecting anaesthesia, comprising a frozen mixture of nitrous oxide and carbon dioxide and containing not less than seven percent nor over fifteen percent of carbon dioxide, the remainder being substantially all nitrous oxide; said mixture having a triple point temperature below 0 degrees F. and having a triple point pressure above atmospheric pressure whereby it can be shipped in unsealed packages as a frozen solid.

7. A refrigerating agent consisting of a solid mixture of nitrous oxide and carbon dioxide, said mixture having a triple point pressure in excess of 14.7 pounds per square inch absolute, and being capable of accepting heat from and thereby cooling an adjacent object, and being effective to absorb said heat by way of sublimation while the residual refrigerant medium remains solid under atmospheric pressure.

JUSTUS C. GOOSMANN.